United States Patent [19]

Walter et al.

[11] 3,777,169

[45] Dec. 4, 1973

[54] METHOD AND MEANS FOR DETECTING FOREIGN PARTICLES IN LIQUID FILLED CONTAINERS

[75] Inventors: William H. Walter, East Granby, Conn.; Robert F. Mesnik, Yorktown Heights, N.Y.

[73] Assignee: Emhart Corporation, Bloomfield, Conn.

[22] Filed: Jan. 26, 1972

[21] Appl. No.: 221,008

[52] U.S. Cl. .............. 250/218, 178/6, 178/DIG. 37, 250/222 PC, 356/240

[51] Int. Cl. .......................... G06m 7/00, H04n 7/00

[58] Field of Search ..................... 250/218, 222 PC, 250/223 B; 356/196–198, 208, 240; 178/DIG. 37, 6, 61

[56] References Cited

UNITED STATES PATENTS 3,120,578 2/1964 Potter et al. ................. 178/DIG. 37

3,576,442 4/1971 Nakamura ...................... 250/223 B 3,598,907 8/1971 Drinkuth ................................ 178/6

*Primary Examiner*—Walter Stolwein

*Attorney*—John C. Hilton

[57] ABSTRACT

A liquid filled transparent container is spun momentarily and successive video frames are then taken by a camera while the liquid swirls in the stationary container. One or more of these video frames can be stored in memory in digitized form. Two or more digitized video frames are then compared electronically, by "subtracting" one from the other, to generate a reject signal when the "difference" exceeds some preset number of digitized pulses. The threshold voltage for the video frame being generated can be altered by reference to a stored video frame in order to increase the sensitivity of that frame at discrete points corresponding to voltages exceeding the threshold voltage in the stored frame and desensitized at all other points to reduce the liklihood of spurious signals.

10 Claims, 11 Drawing Figures

METHOD AND MEANS FOR DETECTING FOREIGN PARTICLES IN LIQUID FILLED CONTAINERS

BACKGROUND OF THE INVENTION

This invention relates to the inspection of liquid filled transparent containers by means of a video camera capable of generating several video voltage patterns, or frames. The containers are momentarily spun to cause the liquid, and any particles, to swirl in the stationary container and means is provided for subsequently generating two or more of the video frames for comparison, and to produce an error signal whenever a moving particle is "seen" in different positions in these video frames. U. S. Pat. No. 3,598,907 issued Aug. 10, 1971 and assigned to the assignee herein, show such a machine and method, and that disclosure describes the basic concept upon which the present disclosure represents a significiant improvement.

The basic approach described in the above cited patent depends upon digitizing the video signal pattern or frame to provide a timed pulse in a synchronized memory device wherever the video voltage exceeds some predetermined threshold value. The sensitivity of the system dictated by the value of this threshold voltage, which value ideally corresponds to a foreign particle above some predetermined size. Experience has shown that the video voltage variation from one from to another, due to light intensity changes and to voltage drift, has sometimes been on the order of magnitude of the preset sensitivity. As a result of this fact successive video frames do not necessarily produce identical pulse patterns when they should, that is, when the transparent container is stationary and the liquid contents are swirling but are free of foreign particles. It has been found that a dust particle, or glass defect on the container surface will sometimes cause a pulse in one frame, but fail to do so in a succeeding video frame due to variation in overall light intensity and/or voltage drift. This result will sometimes produce an error or reject signal in the system described in U. S. Pat. No. 3,598,907 in spite of the fact that no foreign particles above the undesirable size are present. Spurious error or reject signals can also occur when the initial frame fails to trigger a digitized pulse due to a dust particle or glass defect if a subsequent frame does produce such a pulse.

The general object of the present invention is to provide a method and means for preventing reject signals from being generated due to these slight variations in light intensity, and/or due to voltage drift in the circuitry shown and described in U. S. Pat. No. 3,598,907.

SUMMARY OF THE INVENTION

This invention takes advantage of the fact that only moving particles are to be inspected for in practicing the method and means of U. S. Pat. No. 3,598,907, and whenever a return is generated from the video camera with a peak exceeding the threshold voltage not only is a digital pulse fed to the memory device, but during the succeeding video frame or frames the threshold voltage is altered by introducing negative going pulses wherever a positive digital pulse was stored in memory. This method of increasing sensitivity at selected locations and desensitizing the system at all other locations in the video voltage pattern of succeeding video frames has the effect of lessening the liklihood of spurious returns due to stationary dust particles, or glass defects, as caused by voltage drift and/or light intensity variations. However, as a result of the basic system characteristic of looking only for particles that will have moved between the original and any succeeding frame or frames, the overall system sensitivity will not suffer as a result of this selective sensitivity variation.

DETAILED DESCRIPTION

Figure 1:
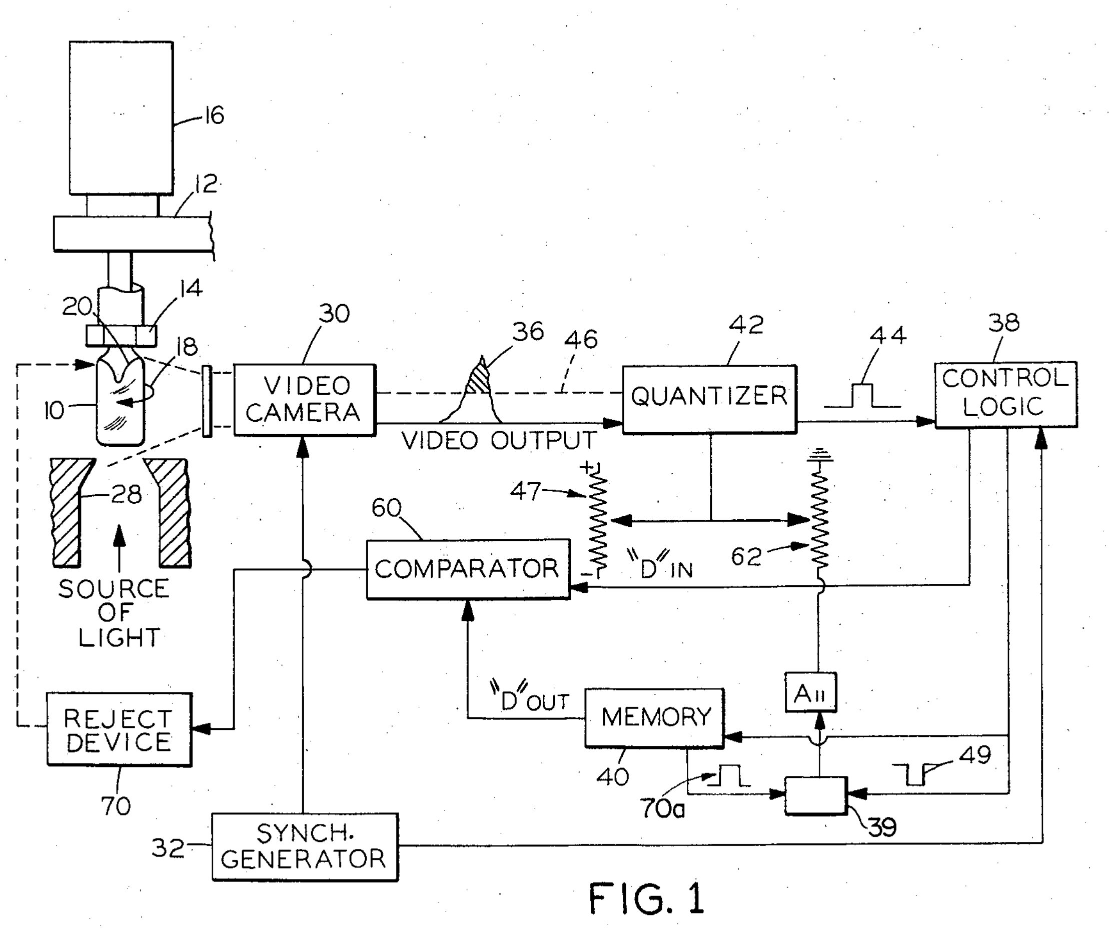
FIG. 1 is a schematic block diagram of the system shown and described in U. S. Pat. No. 3,598,907 with the feedback loop of the present invention also incorporated therein.

Turning to the drawings in greater detail, FIG. 1 shows a liquid filled transparent container 10 which has been positioned at an inspection station by suitable article handling means which may include an intermittently driven turret 12, and a chuck 14 which permits the container 10 to be spun on its vertical axis at least momentarily by the spin motor 16 in order to cause the liquid contents to the container to swirl as indicated generally by the arrow 18. Means is provided for illuminating the transparent container from beneath by a light source which is preferably shielded as indicated generally at 28, and the source of light is preferably in the form of a bundle of fiber optic elements. The liquid contents will present a dark or black background for the video camera 30 in order to provide a contract for any foreign particles in the liquid. As shown in FIG. 1 the container has been spun to a predetermined speed and then braked to a stop so that the liquid contents are swirling within the container creating a vortex 20 at the upper surface of the liquid as shown.

The video camera 30 comprises a conventional component of the system, and is adapted to produce a video output voltage 36 of conventional form. The camera is preferably driven in synchronism with other components of the system by a sync generator 32, which produces continuous clock pulses.

Figure 2:
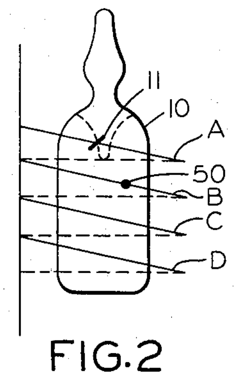
FIG. 2 is a schematic view of the first video frame showing several scan lines and a liquid filled container with a stationary defect and a foreign particle moving in the swirling liquid.
Figure 4:
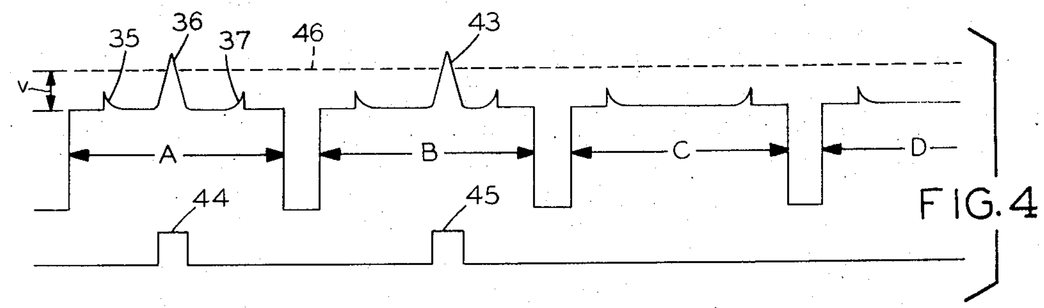
FIG. 4 shows schematically a portion of the video voltage pattern generated by the "picture" of FIG. 2, together with the digital trace of voltage pulses resulting from a preset threshold voltage V, indicated in broken lines.

The output of the video camera, indicated generally at 36 is digitized and otherwise treated in a quantizer 42 in order to produce a trace of digital pulses, one of which is shown at 44, corresponding to each peak 36 in the video output which exceeds a preset threshold voltage 46. This preset threshold voltage is preferably preset by means of a conventional potentiometer 47, and the series of digital pulses are fed through a switching device, comprising a portion of the control logic 38, to a delay line or other suitable memory device 40. The quantizer 42 thus serves to provide a simple stretch pulse form for each peak voltage 36 occuring in each of the scan lines of the inital frame generated by the video camera 30 whenever this peak voltage exceeds the threshold voltage level set by the potentiometer 47, and as indicated generally by the broken line 46 in FIG. 1. FIG. 4 shows in schematic fashion the voltage output of the video camera resulting from a typical inspection of a transparent glass ampoule 10 as shown in FIG. 2. The first scan line A of the first video frame depicted in FIG. 4 will produce a small peak voltage 35 as the camera detects the edge of the glass ampoule, and will produce a peak voltage 36 exceeding the threshold value as it picks up a scratch or dust particle 11 best shown in FIG. 2. As the first scan line A picks up the opposite edge of the ampoule 10 another small voltage variation somewhat less than the threshold voltage 46 will be produced. These small voltage variations caused by the edges of the ampoule may or may not exceed the threshold voltage set by the potentiometer 47. The second scan line B produces similar minor voltage peaks in response to the forward and trailing edge of the ampoule 10, and also a peak voltage 43 exceeding the threshold value 46 as a particle 50 is detected in the liquid filled container. If the ampoule edges produce peaks exceeding the threshold voltage on scan line A, scan line B will also show similar peaks, as will subsequent frame scan lines. The succeeding scan lines C and D exhibit no unusual voltage peaks and therefore produce no digital pulses in the trace shown at the lower portion of FIG. 4. The peak voltages, 36 and 43 respectively, since they exceed the threshold voltage 46 will produce pulses 44 and 45 respectively for storage in the memory 40.

Figure 3:
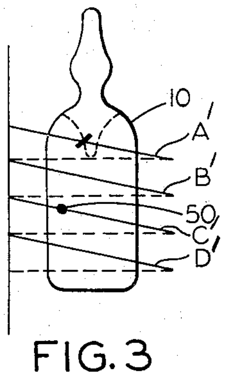
FIG. 3 is a schematic view similar to FIG. 2, but shows a second video frame taken at a slightly later instant of time.
Figure 5:
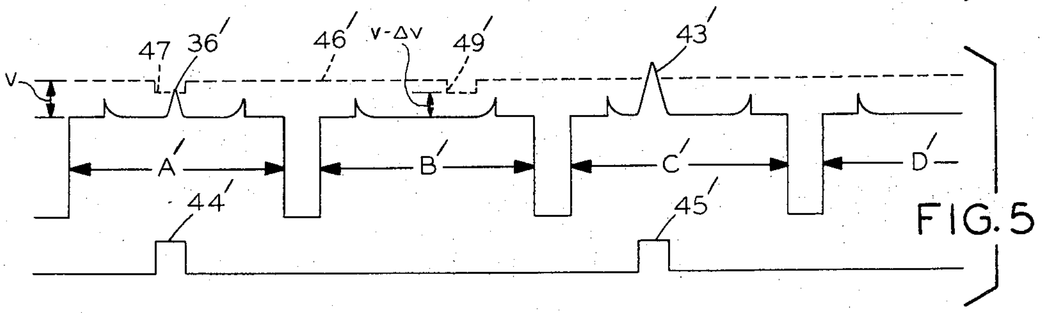
FIG. 5 is a schematic view similar to FIG. 4, showing the composite video voltage trace of the FIG. 3 "picture", and the digital trace of voltage pulses resulting from a preset threshold voltage (V−Δ V), indicated in broken lines.

At a slightly later instant of time the video camera 30 sees the picture shown in FIG. 3, and the resulting video voltage output in both conventional and digital form is shown in FIG. 5. From FIG. 5 it will be apparent that the moving particle 50 in the liquid filled container will have moved with time and will appear on a different scan line C′ than the scan line depicted in FIGS. 2 and 4. For example, the peak voltage 43′ shown in FIG. 5 will produce the digital voltage pulse 45′ shown.

Figure 6:
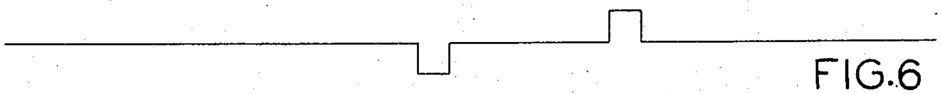
FIG. 6 shows the result of subtracting the digital voltage traces of FIGS. 4 and 5.

In accordance with the disclosure of the U. S. Pat. No. 3,598,907 referred to above the initial or master video frame voltage pattern is stored in the memory device 40 for later recall in timed relationship with the production of a succeeding voltage pattern for comparison in the comparator 60. This comparator serves to electronically subtract one digital voltage pulse trace, such as that shown on the lower portion of FIG. 4, from a succeeding digital voltage pulse trace, such as that shown in the lower portion of FIG. 5, to produce a resultant voltage trace as shown in FIG. 6. This process of subtracting one digital trace from another theoretically produces pulses only if a moving particle has been detected and the output of the comparator thereby feeds an error signal to a reject device 70 in order to permit automatic inspection of the ampoule 10 and rejecting of defective ampoules in an automated fashion.

The foregoing description summarizes briefly the disclosure of the above mentioned U. S. Pat. No. 3,598,907, and the description to follow deals with improvements to the above described system whereby any video voltage variations from one frame to another due solely to light intensity changes and/or to voltage drift in the components of the system will not produce digital pulses which are taken as foreign particles by the system, causing rejection of acceptable ampoules. Briefly, this result is accomplished by sensitizing the video voltage output of the camera at preselected locations, and desensitizing at other locations depending upon the presence of peak voltage signals in the first or master video frame, in order to insure that succeeding video frames produce identical pulse patterns except where the presence of a foreign or drifting particle in the liquid is detected. Considering first the sensitizing aspect of the invention and referring particularly to the schematic block diagram disclosure of FIG. 1, when the control logic 38 provides a "store" pulse 49 to a NAND gate 39, the gate output will be high and emitter follower $A_{11}$ conducts. Thus, potentiometer 62 controls the threshold voltage momentarily for the quantizer 42 in conjunction with the potentiometer 47.

Thus, the threshold voltage (V in FIG. 5) can be selectively sensitized during succeeding video voltage frames whenever a digital pulse, such as that shown at 44 in FIG. 4, has been detected or produced in the first or master frame. More particularly, a pulsed reduction in the threshold voltage 46′, as indicated generally at 47, will assure that the peak 36′ generates a digital pulse 44′ even though the peak voltage 36′ is less than the threshold voltage 46′ possible from the preset voltage value V. It will be apparent from FIG. 5 that a similar pulsed reduction 49′ of the threshold voltage 46′ will also occur at the clock pulse location 45 of the moving particle from the peak voltage 43 of the first picture taken by the video camera (FIG. 2). However, since this particle 50 will have moved from this position when the second picture (FIG. 3) is taken by the video camera no digital pulse will be produced, and only the digital pulse 45′ from the new position of the moving particle 50 on scan line C′ will appear on the digital pulse trace line shown in the lower portion of FIG. 5.

When the digital voltage traces shown in the lower portions of FIGS. 4 and 5 respectively are electronically compared, or "subtracted" one from the other, the pulses 44 and 44′ will cancel one another, whereas the voltage pulses 45 and 45′, since they occur at a different clock location on the digital pulse trace, will appear as shown in FIG. 6 with the result that an error signal will be generated causing the reject device to be actuated and that particular container to be rejected. However, rejection of this particular container is necessarily due to the presence of a foreign particle 50 in the swirling liquid, and not due to slight voltage variation arising as a result of a "fixed" voltage peak as indicated generally at 36 in FIG. 4 and 36' in FIG. 5. It will be apparent from an inspection of FIG. 5 that if the threshold voltage, 46', shown in FIG. 5, were held constant, as at that value indicated at V in FIG. 4, then the second frame video voltage output would not result in a pulse such as that shown at 44' in FIG. 5. Therefore, even if the foreign particle 50 had not been present in that particular container, the reject device would nevertheless have been actuated, and an otherwise acceptable container would have been relegated to the pile of rejected containers unnecessarily.

Figure 7:
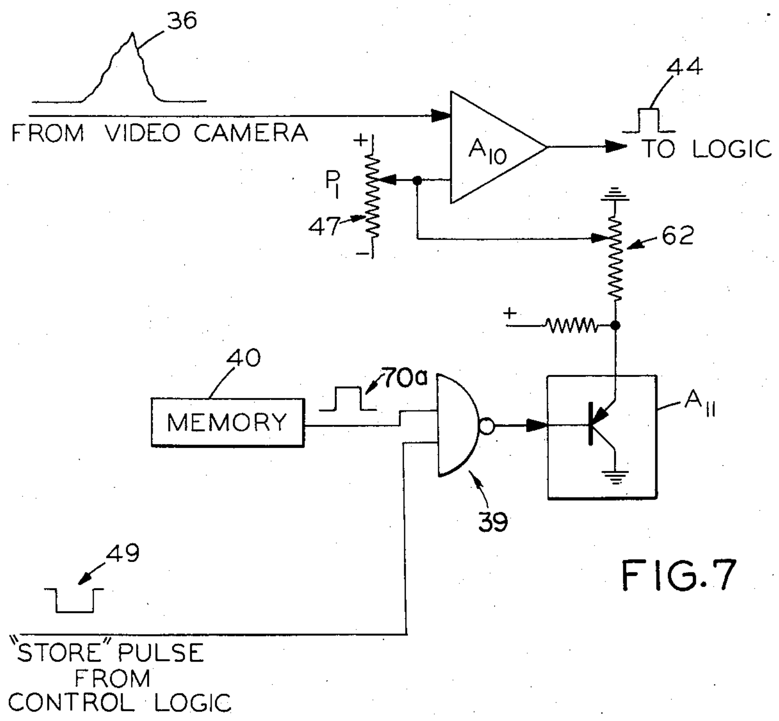
FIG. 7 is a detailed view of the feedback loop shown in FIG. 1 for altering the preset threshold voltage of FIG. 5.

Turning now to a more detailed description of the feedback loop shown schematically in FIG. 1 and comprising the NAND gate 39, the emitter follower $A_{11}$, and the potentiometer 62, FIG. 7 shows these components in somewhat greater detail and this view also includes a portion of the quantizer 42 comprising the amplifier $A_{10}$. When the control logic 38 produces a "store" pulse 49, the NAND gate 39 is disabled, and no feedback pulses 70*a*, 70*a* are provided from the memory 40, and the base of the emitter follower $A_{11}$ will be high. Thus the "stored frame" is digitized based on the sensitivity setting of the potentiometer 47 plus the setting of potentiometer 62. The system is so designed that this preset voltage threshold can be varied from a "normal" level V to a slightly reduced level (V−ΔV) by utilizing the digitized pulses 70a from the memory device 40. The NAND gate 39 is enabled for all frames save only the stored or master frame, and each pulse 70*a* will produce a negative pulse to the base of emitter follower $A_{11}$. A negative pulse output at the emitter follower $A_{11}$ reduces the voltage of feedback potentiometer 62, which in conjunction with potentiometer 47 lowers the threshold voltage at $A_{10}$ to (V−ΔV). Thus, the sensitivity of quantizer 42, and more particularly of amplifier $A_{10}$, is momentarily increased to assure that slight voltage peaks such as shown at 36' in FIG. 5 do produce digital pulses as shown at 44' in order to cancel previously produced pulses in the master framed stored in memory, as shown at 44 in FIG. 4. Therefore, when these digital traces are compared in the comparator 60, as shown in FIG. 6, any resultant pulses are due to the actual presence of foreign particles in the liquid contents of the container rather than to the spurious returns or noise sometimes encountered as a result of light intensity variations and/or voltage drift in one or more of the system's components.

Figure 9:
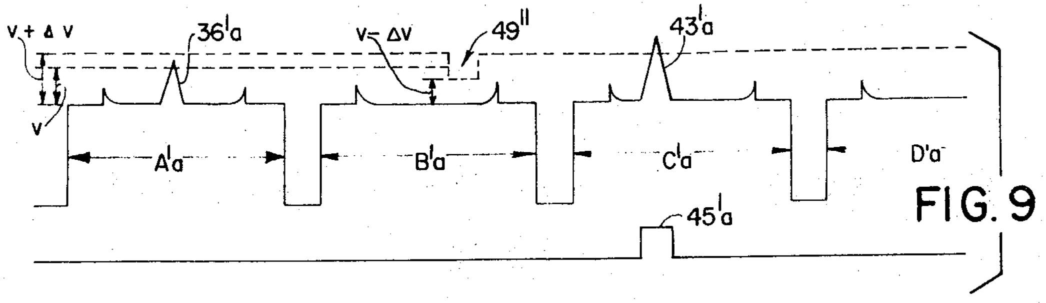
FIG. 9 is a schematic view similar to FIG. 8 showing the composite video voltage trace of the FIG. 3 "picture" and the digital trace of voltage pulses resulting from a desensitized threshold voltage (V+Δ V).

The remaining FIGS., 8–11 inclusively, illustrate a method and means for desensitizing the video frame, or frames, following the first, or master frame, and doing so at all locations other than those locations where the threshold voltage V is subjected to the pulsed reduction (ΔV), as shown for example at 49'' in FIG. 9.

Figure 8:
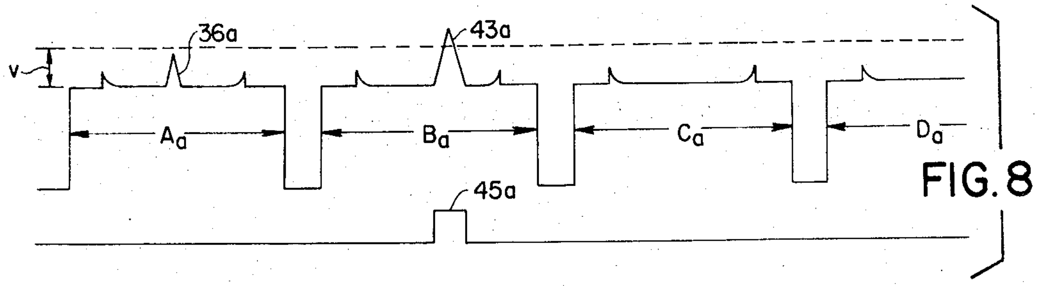
FIG. 8 is a schematic view similar the composite viedo voltage traces of the FIG. 2 "picture", but illustrating the result of an alternative embodiment of the present invention.

Referring more particularly to FIG. 8, let us assume that the first or master video frame produced in response to the physical picture of FIG. 2, and more particularly the defect 11, were to produce a slightly smaller voltage peak 36*a*, such that the preset threshold voltage V (46 in FIG. 1) is not exceeded. From the foregoing description of FIGS. 4–7 inclusively it will be apparent that the stationary defect 11 in FIG. 3 will be picked up in a succeeding video frame such that it might or might not produce a peak voltage which exceeds this threshold voltage (see FIGS. 9 and 5 at 36*a'* and 36' respectively). If the peak 36' of FIG. 5 is produced, the method and means described with reference to FIGS. 4–7 will operate to produce no error signal. However, if the peak 36*a'* of FIG. 9 is produced, the threshold voltage V must be increased to avoid producing an error signal.

Figure 10:
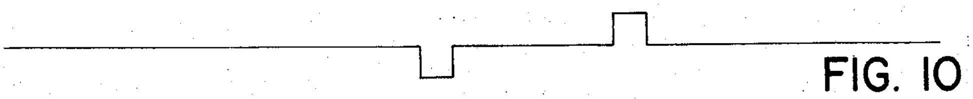
FIG. 10 shows the results of subtracting the digital voltage traces of FIGS. 4 and 5 .

The avoidance of such an error signal is achieved with the method and means as illustrated in FIGS. 8–11, and more particularly in FIG. 9 wherein the threshold voltage V is indicated as increased by (ΔV), to V+ΔV), throughout this particular frame (and all frames subsequent to the first or master frame for that particular container). This desensitizing of all frames subsequent the first one has the effect of precluding the occurrence of the error signal referred to in the previous paragraph, and yet does not inhibit the pulsed reduction in this threshold voltage at 49''. As shown, the threshold at this location will continue to be (V−ΔV), in the previously described embodiment of FIGS. 4–7 inclusively. The resulting comparison of the digital traces in FIG. 10 is then identical to that depicted in FIG. 6, in spite of the fact that the peak voltages 36*a'* and 36*a* of FIGS. 8–11 are reversed from those depicted in the FIGS. 4–7. This raising of the threshold voltage substantially decreases the likelihood of a false error signal.

Figure 11:
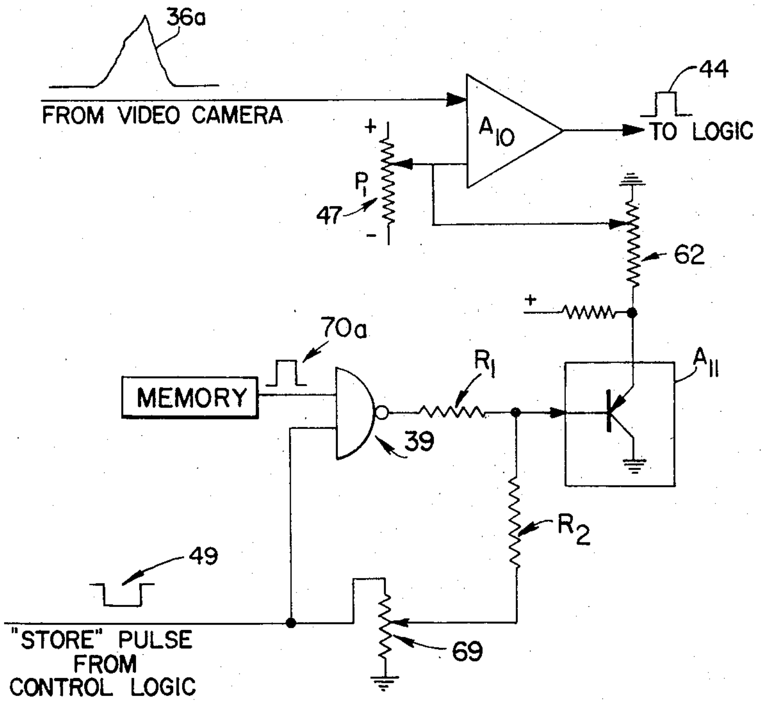
FIG. 11 is a detailed view of an alternative feedback loop to that shown in FIG. 7 for altering the threshold voltage as shown in FIG. 9.

Turning now to the circuitry for desensitizing the threshold voltage of those video frames subsequent to the first, or master frame, FIG. 11 shows the same general circuit depicted in FIG. 7, but supplemented by a plurality of resistors $R_1$, $R_2$ and potentiometer 69. The combination of resistors $R_1$ and $R_2$ operates to produce three voltage levels on the base of emitter follower $A_{11}$ and hence to feedback potentiometer 62. Potentiometer 69 provides a convenient means to adjust the midlevel voltage or other desired bias V. When a "store" pulse occurs the voltage out of NAND gate 39 will be high and the voltage applied to potentiometer 69 will be low. This will result in the nominal threshold voltage V. For subsequent frames the voltage on potentiometer 69 will be high and the output of gate 39 will be low or high depending on the presence or absence of feedback pulses 70*a*, 70*a* from memory 40. If no feedback pulse 70a is present the resultant voltage divider action of $R_1$ and $R_2$ will result in V+ΔV. Thus for the subsequent frames the threshold is raised for all locations where there was no stored pulse in the master frame. Otherwise the system operates as described for FIG. 7 wherein the threshold is lowered (V−ΔV) for those locations where a pulse was stored in the master frame.

In conclusion then, the alternative embodiment described above with reference to FIGS. 8, 9, 10 and 11 provides a threshold voltage V for digitizing the first or master video frame, after which first frame the threshold voltage is increased to (V+ΔV) except at those particular locations where a digitized pulse has been recorded in memory, at which locations the threshold voltage is momentarily reduced to (V−ΔV).

We claim

1. A method of inspecting transparent liquid filled containers for foreign particles comprising the steps of a. spinning the container to cause the liquid contents to swirl therein, b. stopping the container while the liquid contents continue to swirl, c. generating a first video voltage pattern as a result of scanning the container and contents with a video camera, d. providing timed digital voltage pulses corresponding to any peak portions of said first video voltage pattern which exceed a predetermined threshold voltage, e. storing said timed pulses for subsequent recall from a memory device, f. generating a succeeding video voltage pattern as a result of scanning the container and contents with a video camera at a later instant of time, g. altering said threshold voltage during said succeeding voltage pattern so that said threshold voltage is decreased slightly at the location corresponding to each peak portion of said first video voltage pattern, h. digitizing said succeeding video voltage pattern to provide a voltage trace with pulses corresponding to peak portions, i. synchronizing said first and succeeding digitized video voltage patterns, j. comparing said first and succeeding digitized voltage patterns by electronically comparing one to the other.

2. The method of claim 1 wherein said step of altering said threshold voltage during said succeeding video voltage pattern comprises utilizing the stored digitized voltage pattern for generating negative going pulses corresponding in clock locations to said digital voltage pulses.

3. A system for inspecting transparent liquid filled containers for foreign particles, comprising means for momentarily spinning a container so that its contents swirl therein at an inspection station, video camera means for scanning the stationary container and its swirling contents to generate a first video voltage pattern, quantizer means for processing said video patterns to provide digital voltage traces with timed pulses corresponding to any peak portions of said video voltage patterns exceeding a predetermined threshold voltage, memory means for storing at least one of said digital voltage traces, means for altering said threshold voltage during a succeeding video voltage pattern so that the threshold voltage is decreased slightly at the location corresponding to each peak portion of said first video voltage pattern, clock means for driving said video camera means in timed relation with said memory means, and comparator means for electronically comparing said digital voltage traces.

4. The system of claim 3 wherein said means for altering said threshold voltage during said succeeding video voltage pattern comprises means for generating negative going pulses corresponding in clock locations to said timed pulses of said digitized one video voltage pattern, said negative going pulses reducing said preset threshold voltage at said clock locations of at least one succeeding video voltage pattern.

5. A method of inspecting transparent liquid filled containers for foreign particles comprising the steps of a. spinning the container to cause the liquid contents to swirl therein, b. stopping the container while the liquid contents continue to swirl, c. generating a first video voltage pattern as a result of scanning the container and contents with a video camera, d. providing timed digital voltage pulses corresponding to any peak portions of said first video voltage pattern which exceed a predetermined threshold voltage, e. storing said timed pulses for subsequent recall from a memory device, f. generating a succeeding video voltage pattern as a result of scanning the container and contents with a video camera at a later instant of time, g. altering said threshold voltage during a succeeding voltage pattern so that said threshold voltage is increased slightly, h. digitizing said succeeding video voltage pattern to provide a voltage trace with pulses corresponding to peak portions, i. synchronizing said first and succeeding digitized video voltage patterns, j. comparing said first and succeeding digitized voltage patterns by electronically comparing one to the other.

6. The method of claim 5 wherein said step of altering said threshold voltage during said succeeding voltage pattern further comprises increasing said threshold voltage except at those clock locations corresponding to those digital pulses which have been stored from said first voltage pattern.

7. The method of claim 2 wherein said step of altering said threshold voltage during said succeeding voltage pattern further comprises increasing said threshold voltage at all locations other than said negative going pulses.

8. A system for inspecting transparent liquid filled containers for foreign particles, comprising means for momentarily spinning a container so that its contents swirl therein at an inspection station, video camera means for scanning the stationary container and its swirling contents to generate a first video voltage pattern, quantizer means for processing said video patterns to provide digital voltage traces with timed pulses corresponding to any peak portions of said video voltage patterns exceeding a predetermined threshold voltage, memory means for storing at least one of said digital voltage traces, means for altering said threshold voltage during a succeeding video voltage pattern so that said threshold voltage is increased slightly, clock means for driving said video camera means in timed relation with said memory means, and comparator means for electronically comparing said digital voltage traces.

9. The system of claim 8 wherein said means for altering said threshold voltage during said succeeding video voltage pattern further comprises means for generating negative going pulses to decrease said threshold voltage at clock locations in said succeeding voltage pattern corresponding to said timed pulses of said digitized one video voltage pattern, said negative going pulses serving to reduce said increased threshold voltage to a value slightly lower than that of said preset threshold voltage.

10. The system of claim 9 wherein said means for altering said threshold voltage (V) during said succeeding video voltage pattern comprises increasing said voltage slightly (to $V+\Delta V$) except during said negative going pulses wherein said voltage is decreased (to $V-\Delta V$) to provide three threshold voltage levels which permit the overall sensitivity of the system to be automatically selectively sensitized and desensitized.

* * * * *

UNITED STATES PATENT OFFICE
CERTIFICATE OF CORRECTION

Patent No. 3,777,169 Dated December 4, 1973

Inventor(s) William H. Walter and Robert F. Mesnik

It is certified that error appears in the above-identified patent and that said Letters Patent are hereby corrected as shown below:

Abstract, last line, "liklihood" should be --likelihood--.

Col. 1, line 23, "wherever" should be --whenever--.

Col. 1, line 28, "from" should be --frame--.

Col. 1, line 68, "liklihood" should be --likelihood--.

Col. 2, line 66, "contract" should be --contrast--.

Col. 3, line 12, "trace" should be --series--.

Col. 3, line 16, "preset" should be --adjusted--.

Col. 3, line 17, "are" should be --is--.

Col. 3, line 37, "These small" should be deleted and the "V" capitalized in "voltage".

Col. 3, line 40, "minor" should be --small--.

Col. 4, line 16, after "whereby" "any" should be deleted.

Col. 4, line 18, after "due" "solely" should be deleted.

Col. 4, line 25, after "presence of" --detected-- is omitted.

Col. 4, line 38, "sensitized" should be --reduced--.

Col. 4, line 40, after "has been" "detected or" should be deleted.

ORM PO-1050 (10-69)

USCOMM-DC 60376-P69
★ U.S. GOVERNMENT PRINTING OFFICE : 1969 O—366-334.

Sheet #2

UNITED STATES PATENT OFFICE
CERTIFICATE OF CORRECTION

Patent No. 3,777,169 Dated December 4, 1973

Inventor(s) William H. Walter and Robert F. Mesnik

It is certified that error appears in the above-identified patent and that said Letters Patent are hereby corrected as shown below:

Col. 4, lines 45 and 46, after "voltage 46'" "possible from the present voltage value V" should be deleted.

Col. 5, lines 1 and 2, "variation arising as a result of a 'fixed' voltage peak" should be deleted and --variations of a stationary signal,-- inserted.

Col. 5, line 21, "and" should be --so--.

Col. 5, line 22, the second occurance of ",70a" should be deleted.

Col. 5, line 41, "framed" should be --frame--.

Col. 5, lines 46-49, "rather than to the spurious returns of noise sometimes encountered as a result of light intensity variations and/or voltage drift in one or more of the system's components" should be deleted.

Col. 6, line 10, "to V+ΔV)" should be --to (V+ΔV)--.

Col. 6, line 42, the second occurance of ",70a) should be deleted.

Col. 7, line 13, after "each" --detected-- is omitted.

Col. 7, line 17, after "to" --said detected-- is omitted.

Col. 8, line 28, after "other than" --at-- is omitted.

Signed and sealed this 23rd day of July 1974.

(SEAL)
Attest:

McCOY M. GIBSON, JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334.